United States Patent [19]
Gogarty

[11] 3,734,189
[45] May 22, 1973

[54] HYDRAULIC FRACTURING PROCESS USING A TEMPERATURE-INVERTED FRACTURING FLUID

[75] Inventor: William B. Gogarty, Littleton, Colo.

[73] Assignee: Marathon Oil Company, Findlay, Ohio

[22] Filed: Jan. 3, 1972

[21] Appl. No.: 215,095

[52] U.S. Cl..................................166/308, 166/283
[51] Int. Cl..........................E21b 43/26, E21b 43/27
[58] Field of Search..................166/308, 281, 283, 166/307; 252/8.55 RR

[56] References Cited
UNITED STATES PATENTS

| | | | |
|---|---|---|---|
| 3,378,074 | 4/1968 | Kiel | 166/308 |
| 3,406,115 | 10/1968 | White | 166/308 X |
| 3,500,929 | 3/1970 | Eilers et al. | 166/308 X |
| 3,500,932 | 3/1970 | Webb | 166/308 |
| 3,552,494 | 1/1971 | Kiel | 166/308 |
| 3,592,266 | 7/1971 | Tinsley | 166/308 X |
| 3,603,400 | 9/1971 | Son, Jr. | 166/308 |
| 3,613,789 | 10/1971 | Son, Jr. | 166/281 |
| 3,654,994 | 4/1972 | Slagel et al. | 166/308 |

*Primary Examiner*—Stephen J. Novosad
*Attorney*—Joseph C. Herring et al.

[57] ABSTRACT

Oil-external surfactant mixtures useful for fracturing subterranean formations, especially formations containing water-sensitive clays, and which are charactertistic of exhibiting a viscosity increase on temperature increase are obtained by mixing 25–95 percent by volume hydrocarbon, 1–70 percent by volume aqueous medium, at least about 3 percent by volume surfactant and optionally about 0.01–20 percent by volume cosurfactant and/or 0.001–5 percent by weight electrolyte (based on the aqueous medium). In addition, the surfactant mixture can contain silica flour, viscosity-increasing agent, propping agents, etc.

15 Claims, No Drawings

HYDRAULIC FRACTURING PROCESS USING A TEMPERATURE-INVERTED FRACTURING FLUID

CROSS REFERENCE TO RELATED APPLICATIONS

U.S. Pat. application identified as Ser. No. 20,102, filed Mar. 16, 1970, now U.S. Pat. No. 3,613,789, teaches fracturing a formation using a micellar dispersion as the fracturing fluid. Propping agents, viscosity increasing agents, etc. can be added to the micellar dispersion.

BACKGROUND OF THE INVENTION

1. Field of the Invention

This invention relates to novel, oil-external surfactant fracturing fluids which are characteristic of exhibiting a viscosity increase upon temperature increase. These surfactant mixtures are useful to fracture subterranean formations, especially those formations at temperatures above ambient wherein a viscous fracturing fluid is desired.

2. Prior Art to the Invention

U. S. Pat. No. 2,838,116 to Clark et al. teaches obtaining a uniform fracturing profile by alternately injecting fracturing fluids and sealing or diverting agents.

U. S. Pat. No. 3,378,074 to Kiel teaches the use of oil-external emulsions as fracturing agents and the use of wetting agents to reduce friction between the casing and the fracturing agent.

U. S. Pat. No. 3,467,188 to Gogarty teaches the use of oil-external micellar dispersions to increase the injectivity index of wells. U. S. Pat. No. 3,467,194 to Kinney et al. teaches stimulating producing wells with micellar dispersions. Other patents teach improvements in stimulating wells, examples include U. S. Pat. No. 3,474,865 to Gogarty et al.; U.S. Pat. No. 3,545,546 to Surkalo et al.; U. S. Pat. No. 3,554,288 to Ross; U.S. Pat. No. 3,554,289 to Webb; U. S. Pat. No. 3,568,772 to Gogarty et al; and U.S. Pat. No. 3,572,416 to Kinney et al.

U. S. Pat. No. 3,500,932 to Webb teaches injecting a micellar solution before a fracturing fluid to clean perforations, etc.; the overall effect reduces surface energy requirements needed to fracture and produce a better fracturing result. Such is accomplished by injecting 0.1–10 barrels of the micellar dispersion per vertical foot of formation and then injecting the fracturing fluid at a pressure sufficient to fracture the formation.

The prior art has generally experienced that the viscosity of fracturing fluids decreases upon a temperature increase. That is, normal fracturing fluids, when injected into a formation are heated as the fluids progress down the well bore and, as a result, they lose their viscosity characteristics. Such is undesirable when fracturing subterranean reservoirs at substantially higher temperatures than ambient. Also, when these high temperatures are encountered, if the fracturing fluids are designed to have a relatively high viscosity at reservoir temperatures, the viscosities at ambient temperature are generally so high that very large energy requirements are necessary to fracture the formation. In certain cases, a veneer of water is injected around the fracture fluid to reduce surface energy requirements. In most cases, fracturing of reservoirs at high temperatures has generally proved difficult due to the fact that a fracturing fluid of sufficient viscosity at the reservoir rock face cannot be efficiently injected into the formation to obtain effective fracturing of the reservoir.

Applicant has discovered a novel characteristic of a fracturing fluid which permits the fracturing of reservoirs at high temperatures and which also permits minimum surface energies required to fracture the formation. Also, formations containing water sensitive clays can be fractured with no adverse effect.

SUMMARY OF THE INVENTION

Applicant has discovered a novel characteristic of particular non-Newtonian fluids comprised of petroleum sulfonates, aqueous medium, and hydrocarbon which exhibit a viscosity increase upon a temperature increase. These systems have the capability of solubilizing oil and water as well as exhibiting relatively large viscosities at high temperatures. Also, the surfactant mixtures by virtue of their viscoelastic properties experience drag reduction wherein a higher flow rate is obtained with a given pressure drop than would be predicted by viscous flow theory. Other additives compatible with the components of the system can be added to impart desired characteristics, e.g. propping agents, etc.

DESCRIPTION OF PREFERRED EMBODIMENTS

The oil-external surfactant mixtures useful with this invention can be micellar solutions or microemulsions or "stable" emulsions. By "stable emulsion" is meant a mixture that is phase stable for a relatively indefinite period of time, e.g. for at least about 2 weeks. The term "oil-external" is identical with "water-in-oil," i.e. oil or hydrocarbon is the outer phase of the surfactant mixtures.

These particular mixtures are non-Newtonian fluids, i.e. there does not exist a linear relationship between the shear rate and the shear stress, e.g. the apparent viscosity of the liquid decreases with increasing shear stress. Thus, the high shear rate in the pipe causes a low apparent viscosity and more fluid flows at a given pressure drop than would occur with a corresponding Newtonian fluid. As the fluid enters the formation, the shear rate decreases and the viscosity increases. This condition causes more effective fracturing. Besides the pseudoplasticity of these mixtures, the drag reduction characteristic of these surfactant mixtures permits high flow rates at minimum pressure drops.

The surfactant mixtures of this invention contain (by volume) about 25 to about 95 percent, preferably about 40 to about 85 percent and more preferably about 50 to about 85 percent hydrocarbon; about 1 to about 70 percent, preferably about 5 to about 55 percent and more preferably about 10 to about 55 percent aqueous medium; about 1.5 to about 20 percent surfactant; and optionally about 0.01 to about 20 percent or more of a cosurfactant, and/or about 0.001 or less up to about 5 percent or more by weight of electrolyte (based on the aqueous medium). The hydrocarbon can be crude oil, a partially refined fraction of crude oil, e.g. kerosene, gas oil, naphtha, etc.; refined fractions of crude oil (e.g. propane, butane, hexane, etc.) or a synthesized hydrocarbon (including alkyl substituted aryl compounds and halogenated hydrocarbons). The aqueous medium can be soft water, brackish water or a brine water. The surfactant can be cationic, anionic, or nonionic but must have at least some water-solubility and oil-solubility characteristics; preferably, the surfactant is a monovalent cation-containing petroleum sulfonate having an average equivalent weight within the range of about 350 to about 525 and more preferably about 400 to about 470. The cosurfactant can be an amine, aldehyde, ester, ketone, ether, but is preferably a hydroxy-containing compound (e.g. aliphatic alcohols and glycols, and alcohols containing a ether grouping(s) or like functional group) containing 1 to about 20 carbon atoms and preferably about 3 to about 16 carbon atoms. The surfactant, cosurfactant, and hydrocarbon can be mixtures of components within their generic groups. The electrolyte is a water-soluble electrolyte and is preferably an inorganic base, inorganic acid or an inorganic salt; it can be the dissolved salts in the aqueous medium.

The components of the surfactant mixture can be admixed in any suitable manner, e.g. stirring or agitation, shaking, pumping, etc. The surfactant mixture can be designed not to phase separate upon storage under wide temperature variations and can be prepared at the well site or any convenient place.

Viscosity of the surfactant mixture can be varied over a wide range permitted by components of the surfactant mixture. Concentrations as well as the character of the components influence the viscosity of the surfactant mixture. For example, the viscosity of a given fluid at a given temperature and shear rate can be increased from 225 to 480 cp by increasing the water concentration 2 percent. Designing high viscosity mixtures for high temperature reservoirs can be obtained by formulating the surfactant mixture with different molecular weight and types of surfactants, cosurfactants, hydrocarbon; varying the concentration(s) of water, hydrocarbon, cosurfactant, electrolyte; etc.

Of course, the viscosity of the surfactant mixture desired in the reservoir will be dependent upon the permeability of the reservoir, temperature of the reservoir and other characteristics of the reservoir. Generally speaking, a relatively high viscous surfactant fracturing fluid is desired to obtain an efficient fracturing process.

Generally speaking the water concentration of the surfactant mixture will vary with the viscosity—e.g. see the figure in U. S. Pat. No. 3,254,714 to Gogarty. This curve indicates that high viscosity peaks of a given microemulsion are realized at low water concentrations and at concentrations around 50 percent. The effect of temperature on these particular microemulsions is the same as a negative water concentration effect, i.e. where the temperature is increased, the viscosity tends to be effected as if water is taken out of the microemulsion. Also, the molecular weight of the surfactant, the molecular weight and type of hydrocarbon and/or cosurfactant and the concentration of the electrolyte can influence the viscosity of the surfactant mixture.

Propping agents may be incorporated into the surfactant mixture. The viscosity of the surfactant mixture is desirably high enough to facilitate keeping in suspension the propping agents. Examples of useful propping agents include coarse sand grain, tempered glass beads, metallic pellets such as aluminum pellets, and similar like materials. Such propping agents are usually present in concentrations of 0.1–5 lbs. per gallon and preferably about 0.5–3.0 lbs. per gallon of fracturing fluid. Sizes of the propping agents generally range from about 6 to about 400, preferably 10 to about 100 or more and most preferably about 10 to about 20 mesh. Of course, the particular reservoir will dictate the desired size of propping agents.

Polymers may be incorporated into both or either of the hydrocarbon and water phases. For example, 0.001 to about 5 percent by weight of the polymer can be added to impart high viscosities. Nonionic polymers are preferred in the water phase and oil phase.

Injection rates of the surfactant mixture will depend on downhole pressure, permeability of the formation, depth of the formation, etc. Such injection rates should be sufficient to cause the formation pressure near the well bore to exceed the "overburden" pressure. For most reservoirs, the injection rates should be sufficient to obtain a formation pressure near the well bore of about 500 to about 5,000 psi.—this will be sufficient for most reservoirs.

Prefracturing agents may be injected before the surfactant mixture to obtain desired effects. Examples of preagents include acids, aqueous acids, and other agents which tend to clean the rock face or the formation to permit a more efficient fracturing process. Also, diverting agents may be intermittently injected while injecting the surfactant mixture to obtain a more uniform fracturing profile—such is specifically recommended in heterogeneous formations.

The oil-external surfactant mixtures are particularly useful in fracturing reservoirs containing water-sensitive clays. That is, adversities caused by clay swelling and particle plugging with water-external systems are not experienced with these surfactant mixtures even though they contain water.

The following examples are presented to teach specific working embodiments of the invention. Unless otherwise specified, all percents are based on volume and the properties of the surfactant mixture are measured at ambient temperature.

EXAMPLE I

An aqueous surfactant mixture which is oil-external is composed of 34.6 percent water (contains about 500 ppm. of total dissolved solids) to which is added 3.6 mg of sodium sulfate per ml of water, 4.4 percent isopropyl alcohol, 7.3 percent sodium petroleum sulfonate having an average equivalent weight of 460 [62 percent active sulfonate] and 53.7 percent straight run gasoline. At 81° the surfactant mixture has a viscosity of about 4.8 cp., at 90°F. a viscosity of 7.8 cp., and at 100°F. a viscosity of about 25 cp.

EXAMPLE II

An oil-external surfactant mixture is obtained by mixing 18 percent water (contains about 500 ppm total dissolved solids), 8.2 percent Petronate L (a sodium petroleum sulfonate, marketed by Sonneborn Chemical Co., New York, N. Y., 62 percent active sulfonate, average equivalent weight 425); and 73.8 percent kerosene. This mixture is a micellar dispersion and has the following viscosity characteristics:

| Temperature (°F) | Centipoise, measured on a 100 RPM Fann Viscometer |
|---|---|
| 74 | 154 |
| 100 | 220 |
| 150 | 275 |
| 170 | 227 |

For general purpose fracturing, the fluid should desirably have a viscosity of about 200 to about 500 cp. when measured on a Fann Viscometer at 100 RPM and at 170°F. Also, the fracturing fluid should have a fluid loss of under 30 milliters after 30 minutes of flow through a given filter paper at 1,000 psi pressure and at 170°F. Also, the pumpability characteristics of the fracturing fluid should be desirably like that of a 5 cp. fluid. In addition, the drop rate of propping agents within the fracturing fluids should be less than 2 feet per minute for 10 mesh glass beads. In addition, if polymer is added to the fracturing fluid, the polymer should desirably be within the range of about 5 to about 60 lbs. per 1,000 lbs of water—the polymer increases the viscosity of the fracturing fluid.

Silica flour (200 mesh silica sand) or Atomite M-2 (ground calcium carbonate manufactured and marketed by Thompson, Weinman & Co., P. O. Box 130, Cartersville, Georgia, 30120) may be added to reduce fluid loss. Concentrations of about 0.001 to about 2 lbs. per gallon of the silica flour may be used. However, such addition can produce a coagulated mixture which may not be desirable.

Fluid loss characteristics were measured using the procedure defined in API RP-13B, second edition, Apr., 1969, but with the resistivity cell defined in U.S. Pat. No. 3,617,869 to Beitel et al. and operated at 850 psig. A "Specially Hardened Filter Paper for Baroid Filter Processes," Catalog No. 988, 2 ½ in. diameter, marketed by Baroid Division, National Lead Company, Houston, Texas, was used as the filter paper.

The drop rate of the surfactant mixture was determined by observing the time required for a 10 mesh glass bead to drop through the fluid contained in a 200 ml. graduated cylinder.

The apparent viscosity of the fracturing fluid was determined from a mathematical relationship based on data obtained from a capillary tube of 30.33 centimeter length and 0.003365 centimeter in radius. These data were fed to a computer program from which the apparent viscosity vs. shear rate relationship of the fluid was determined.

The characteristics of the fluid identified in Example II were determined. The apparent viscosity for this particular fluid at 170°F. was found to be about 110 cp at a shear rate of 1,000 sec.$^{-1}$. The fluid loss of the fluid containing 0.2 lb/gal of silica flour was 394 cc for the standard API test. The drop rate was less than 0.008 feet per minute.

It is not intended that this invention be limited by the above specific information. Rather, all equivalents obvious to those skilled in the art are intended to be incorporated into the scope of the invention as defined within the specification and appended claims.

What is claimed is:

1. A process of hydraulically fracturing a subterranean hydrocarbon-bearing formation penetrated by at least one well and wherein the formation is at a temperature in excess of ambient temperature, the process comprising injecting into the formation an oil-external, aqueous surfactant mixture having a characteristic of exhibiting a viscosity increase upon a temperature increase and wherein the viscosity of the surfactant mixture is sufficient at the formation temperature to effect efficient fracturing of the formation, the aqueous surfactant mixture comprised of about 25 to about 95 percent by volume hydrocarbon, at least about 3.0 percent by volume surfactant, about 1.0 percent to about 70 percent by volume of an aqueous medium; and injecting the surfactant mixture into the formation and effecting fracturing of the formation.

2. The process of claim 1 wherein the surfactant is a petroleum sulfonate having an average equivalent weight within the range of about 350 to about 525.

3. The process of claim 1 wherein the surfactant mixture contains propping agents.

4. The process of claim 1 wherein the surfactant mixture contains cosurfactant, electrolyte, or cosurfactant and electrolyte.

5. The process of claim 4 wherein the concentration of cosurfactant is about 0.01 to about 20 percent by volume and the concentration of electrolyte is about 0.001 to about 5 percent by weight (based on the aqueous medium).

6. The process of claim 1 wherein a diverting agent is intermittently injected into the formation during the injection of the surfactant mixture to effect a more uniform fracturing profile.

7. The process of claim 1 wherein the surfactant mixture contains a high molecular weight polymer sufficient to impart an apparent viscosity increase to the aqueous surfactant mixture.

8. The process of claim 7 wherein the polymer is nonionic.

9. A process of hydraulically fracturing a hydrocarbon-bearing subterranean formation penetrated by at least one well and wherein the formation is at a temperature in excess of ambient temperature, the process comprising injecting into the formation an oil-external aqueous surfactant mixture which exhibits a viscosity increase upon temperature increase, the aqueous surfactant mixture comprised of about 40 percent to about 85 percent by volume hydrocarbon, about 5 percent to about 55 percent by volume aqueous medium, about 3.0 to about 20 percent by volume of petroleum sulfonate having an average equivalent weight within the range of about 350 to about 525, about 0.01 to about 20 percent by volume of a cosurfactant and about 0.001 to about 5 percent by weight (based on the aqueous medium) of electrolyte; injecting the aqueous surfactant mixture into the formation at a sufficient pressure to effect fracturing of the formation.

10. The process of claim 9 wherein a diverting agent is intermittently injected into the formation while injecting the aqueous surfactant mixture to obtain a more uniform fracturing profile.

11. The process of claim 9 wherein about 0.001 to about 5 percent by weight of a nonionic polymer is incorporated into the hydrocarbon or water phase of the surfactant mixture to increase the viscosity.

12. The process of claim 11 wherein the polymer is incorporated into the water phase.

13. The process of claim 9 wherein the surfactant mixture contains a propping agent.

14. The process of claim 9 wherein the surfactant mixture contains a fluid loss control agent.

15. The process of claim 14 wherein the surfactant mixture contains about 0.001 to about 2 lbs of silica flour per gallon of surfactant mixture.

* * * * *